Feb. 19, 1935.   T. J. MURPHY   1,991,952
ELECTRICAL RECIPROCATING DEVICE
Filed Jan. 28, 1931

Inventor
Thomas J. Murphy
By Wooster & Davis
Attorneys

Patented Feb. 19, 1935

1,991,952

UNITED STATES PATENT OFFICE 1,991,952

ELECTRICAL RECIPROCATING DEVICE

Thomas J. Murphy, Stamford, Conn.

Application January 28, 1931, Serial No. 511,662

13 Claims. (Cl. 172—240)

This invention relates to a reciprocating device and has for an object to provide an electrically operated device which may be used for various purposes such for example as operating a riveting hammer, a rock drill, stamp mill, chisels and innumerable devices where a reciprocating motion of practically any magnitude and frequency is desired.

It is also an object to provide such a device which will operate without contact make and break mechanism and therefore eliminates the objections, limitations and unreliability of such devices.

It is another object of the invention to provide such a device which is of extreme simplicity in construction and operation and may be constructed as a unitary assembly which may be operated by merely plugging into a source of alternating current supply.

Other objects and advantages will appear from the following description taken in connection with the accompanying drawing forming a part of this specification, but it is to be distinctly understood that the drawing is merely illustrative and various modifications may be employed without departing from the principles of the invention.

In this drawing:

Fig. 1 is a partial longitudinal section and side elevation illustrating diagrammatically a device for employing this invention as means for imparting a series of blows such as in a riveting hammer, chisel and the like.

Broadly, the principle of the invention involves the use of a powerful direct current field or magnetic flux for polarizing a reciprocating element, and modulating this field or flux by an alternating current flux to alternately react on the direct current flux simultaneously decreasing or weakening the strength or intensity of the direct current flux so that a powerful magnetic field due to the sums of the total direct current and alternating current ampere turns is impressed alternately on the reciprocating element to shift it in opposite directions. By suitably proportioning the ampere turns producing these fluxes, the flux at one extremity may be doubled and the flux at the other extremity simultaneously neutralized to produce maximum force for reciprocating the element.

Figure 1:
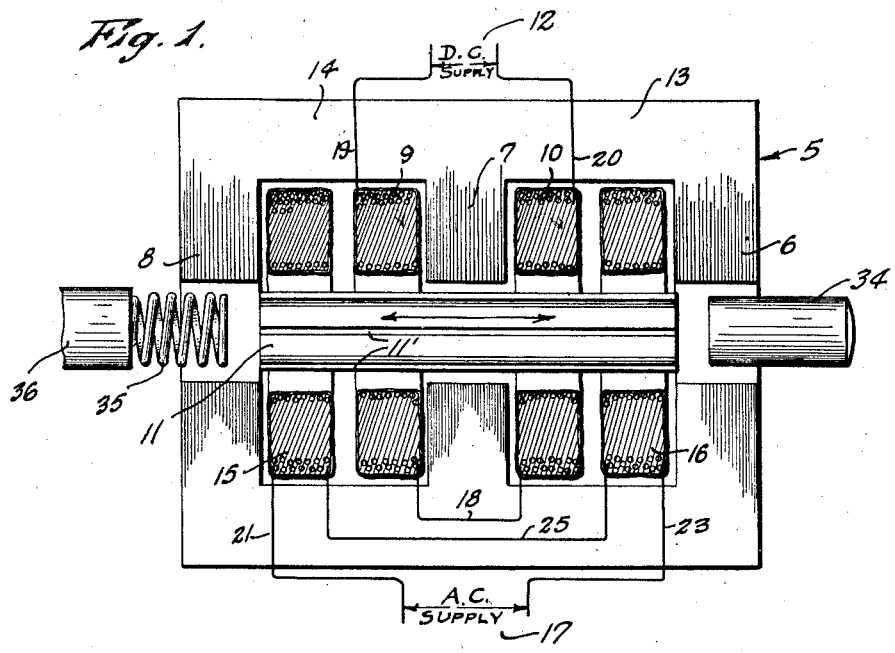

Referring to the accompanying drawing, Fig. 1 shows merely diagrammatically an arrangement of elements for carrying out this method, no attempt being made to show various details of construction, but showing merely diagrammatically the relations of the main elements. As shown 5 represents a laminated silicon steel field structure having the pole pieces 6, 7 and 8, the laminations running longitudinally, and associated with this structure is a pair of direct current coils 9 and 10. Embraced by these coils is a longitudinally reciprocable element 11 which may be a radially slotted ferric armature, the radial slots running longitudinally so as to reduce the eddy currents induced therein. The coils 9 and 10 are so positioned with respect to each other and the reciprocating armature that they tend to shift this armature in opposite directions when the armature is in the central or neutral position. In other words these coils alone would hold the armature in the central or neutral position. In the present instance, the coils 9 and 10 are complementary to each other, are connected as shown at 12 in series with a source of direct current supply and are wound in the same direction and so located with respect to the armature 11 that as indicated above they normally tend to shift the armature 11 in opposite directions and thus hold it in the central or neutral position. Thus, it will be evident that the coil 9 produces a magnetic field or flux flowing through the pole 7, armature 11, pole 8 and connection 14 between the poles 8 and 7, while the coil 10 produces similar field or magnetic flux flowing through pole 6, armature 11, pole 7 and connection 13 between poles 7 and 6. In the present illustration coils 9 and 10 are shown as connected in series and as being wound in the same or like direction, but of course different arrangements may be used and instead of being connected in series the coils 9 and 10 may be transposed or split up into a multiple of coils.

Associated with each of the direct current coils 9 and 10 is an alternating current coil. Thus, there is an alternating coil 15 associated with the coil 9 and another alternating current coil 16 associated with the coil 10, and the alternating coils are so arranged with respect to their respective direct current coils as to add or subtract their magnetic fields or fluxes to or from those of the respective direct current coils as will be more fully described later. In the present illustration coils 15 and 16 are shown as connected in series and as being wound so that when current is flowing in one direction in coil 15 it is flowing in the opposite direction in coil 16, and of course different arrangements may be used. They are supplied with current through connections 17 from any suitable source of alternate current supply.

Figure 2:
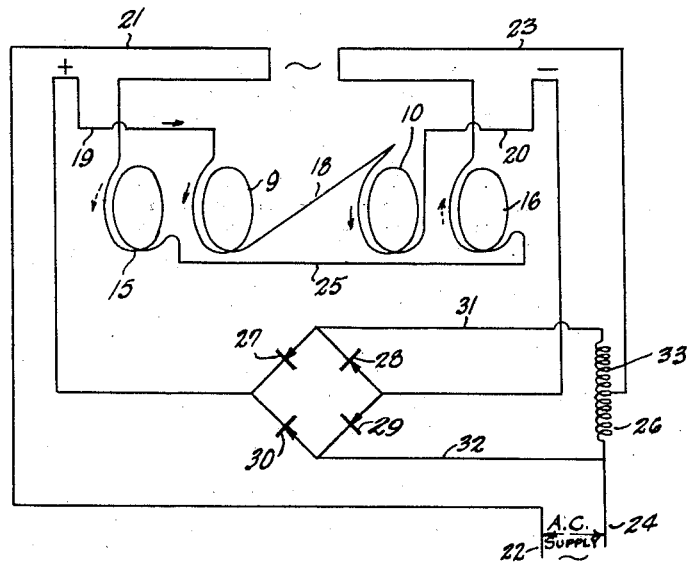
Fig. 2 is a wiring diagram illustrating the principles of the invention.

In Fig. 2 is shown a wiring diagram illustrating how the coils may be arranged and connected to secure the results of reciprocating the armature. The D. C. coils 9 and 10 are shown diagrammatically as wound in the same direction and connected in series by the lead 18, and for the purpose of illustration, the lead 19 from the other end of coil 9 is shown as connected to the positive connection of a source of direct current while the other end of the coil 10 is shown as connected by lead 20 to the negative connection of a source of direct current. The A. C. exciting coil 15 is connected by lead 21 with a connection 22 from a source of alternating current supply and the coil 16 is connected by lead 23 to the other connection 24 from the alternating current supply, and the two coils 15 and 16 are shown as connected in series by lead 25, but it will be obvious that as the same ends of the coils 15 and 16 are connected to the lead 25, the current at any given instant will flow in the opposite direction in coil 16 to the direction of flow in coil 15 and, therefore, that the A. C. coils 15 and 16 are connected in opposition while the D. C. coils 9 and 10 are complementary. It will, therefore, be evident that for any given instant the magnetic flux generated by one A. C. coil will be added to the flux of its adjacent D. C. coil, while at the same instant the magnetic flux of the other A. C. coil is opposing the magnetic flux of its D. C. coil. Therefore, as there is an A. C. current supplied to each of the A. C. coils, the effective magnetic fluxes of each pair of coils is alternately increased and decreased in synchronism with the alternating current and there is an alternate increasing and decreasing of the magnetic fluxes tending to shift the armature 11 in opposite directions, which alternate increasing and decreasing of the flux is of the same frequency as that of the alternating current supply and, therefore, the armature 11 is reciprocated at this frequency.

Thus, for example, if for any given instant we assume the current is flowing in the direction of the arrow in A. C. coil 15 in the same direction as the current in the D. C. coil 9 and the two coils are wound in the same direction as shown, then it will be evident that at this instant the magnetic flux created by A. C. coil 15 is added to that of the D. C. coil 9 and they both tend to shift the armature 11 in the same direction, while at the same instant the current is flowing through A. C. coil 16 in the opposite direction as indicated by the arrow to the current in the D. C. coil 10 and, therefore, at this instant the flux of the A. C. coil 16 is neutralizing or reducing the flux of the D. C. coil 10. It will thus be evident that if the ampere turns of the coils 15 and 16 are equal to those of the D. C. coils 9 and 10 then at this instant the flux of the A. C. coil 16 neutralizes the flux of the D. C. coil 10 and there is no magnetic flux tending to shift the armature 11 to the right. There is then nothing to oppose the action of the fluxes of the coils 9 and 15 tending to shift the armature to the left and maximum force is applied to this armature tending to shift it in that direction.

It will be evident that when the current is reversed through the A. C. coils 15 and 16 an opposite effect will be secured because at this time the flux of the A. C. coil 16 is added to that of the D. C. coil 10 while the flux of the A. C. coil 15 is opposed to that of the D. C. coil 9. Thus, the fluxes tending to shift the armature to the left are reduced or neutralized, while the added fluxes of coils 10 and 16 give maximum force to shift it to the right. It will thus be evident that with this arrangement the A. C. flux modulates the powerful D. C. fields by alternately strengthening and weakening the polar strength or intensity at alternate ends of the reciprocating element to alternately shift it in opposite directions, and that with correct proportions of windings and current complete neutralization of flux can be obtained at one end while the powerful magnetic field due to the sum of the total A. C. and D. C. ampere turns is generated at the other end to shift it in that direction, and thus the armature will be reciprocated with powerful strokes in synchronism with the frequency of the A. C. current impressed on the device.

In large applications with the above principles a D. C. generator may be used for producing the necessary direct current and an A. C. generator may be used for supplying the alternating current supply. As the A. C. and D. C. currents are practically unlimited the apparatus can be built up to practically any size desired and for operating such devices as rock drills, stamping mills and innumerable other devices where a reciprocating motion of practically any magnitude and frequency is required.

For smaller capacity devices a unitary system getting its entire current supply from a single alternating current source may be employed such for example as indicated diagrammatically in Fig. 2. As shown there may be a reactance coil 26 in series with the A. C. coils 15 and 16 and across this coil may be connected a number of rectifying units 27, 28, 29 and 30, connected in a bridge arrangement. The connection between the units 27 and 28 is connected by lead 31 to one end of the coil 26 while the connection between the units 29 and 30 may be connected to the lead 24 or the other end of the coil by a lead 32, while the lead 19 is connected between the units 27 and 30 and the lead 20 is connected between the units 28 and 29 so that rectified or direct current may be supplied to D. C. coils 9 and 10 from the same source of supply as the A. C. current to the coils 15 and 16. The units are connected to permit current flow in the directions indicated by the arrows. Coil 26 may have a few coils 33 beyond the connection of lead 23 to coil 26 to overcome resistance losses in the rectifier and windings and also to reduce inductance of the lower part of the coil 26. In devices under 3 amperes the reactance can be dispensed with entirely.

The reciprocating element 11 may be used for operating various devices, but in Fig. 1 it is shown as applying hammer blows to an anvil 34 for operating such devices as a rivet setter die, star drills and the like. At the opposite end is a recoil spring 35 supported by any suitable means such as an abutment 36 so as to receive and store up the force of the element 11 when it is operated in reverse direction or to the left as viewed in Fig. 1, and then return its force to the element to assist in shifting it in the opposite direction to strike the blow against the anvil. With this arrangement the force operating it in reverse or left hand direction is not lost, but is added to the forces for shifting it in the right hand or working direction.

In Fig. 2 the D. C. coils 9 and 10 on each side of the center of the armature are complementary to each other and the A. C. coils 15 and 16 are connected in opposition. It will, however, be evident that this arrangement is not compulsory as different arrangements may be used so long as there are coils tending to shift the armature in opposite directions and their magnetic fluxes are influenced by other coils to alternately increase them and while increasing the flux in one of the first coils simultaneously decreasing the flux in the other of the first coils, as described above. Thus, good results may be secured by reversing the arrangement of the coils in respect to each other.

Having thus set forth the nature of my invention, what I claim is:

1. In a device of the character described, a reciprocable armature, a pair of direct current coils positioned so as to tend to shift the armature in opposite directions, an alternating current coil adjacent each of the first coils, means connected to a source of alternating current for supplying alternating current to the second coils in synchronism so that each alternating current coil will alternately oppose and assist its adjacent direct current coil and they will simultaneously exert opposite influences on the fields of their respective direct current coils, a rectifying element connected to the source of alternating current, and means connecting the rectifying element and the direct current coils in series with the alternating current coils.

2. In a device of the character described, a reciprocable armature, two pairs of coils embracing said armature, means for supplying direct current to one coil of each pair so that they tend to shift the armature in opposite directions comprising a rectifier connected with a source of alternating current, means connected to said source of alternating current to supply alternating current to the other coils of each pair to alternately add magnetic flux to that of the direct current in each of the first coils and simultaneously produce a flux opposing that of the other direct current coil, and means for connecting said rectifier and direct current coils in series with the alternating current coils.

3. In a device of the character described, a reciprocating armature, a pair of direct current coils providing magnetic fluxes tending to shift the armature in opposite directions, means for supplying a direct current to said coils, a pair of alternating current coils so wound and connected as to be in opposition to each other and arranged one adjacent each of the direct current coils, and means connected to an alternating current supply for supplying an alternating current to the second coils in synchronism so that the magnetic fluxes of the alternating coils are alternately added and opposed to the fluxes of the adjacent direct current coils and while the flux of one alternating coil is added to that of its adjacent direct coil the flux of the other alternating coil is opposed to that of its direct current coil, and said means for supplying direct current comprising a rectifier connected to the alternating current supply so that the direct current impulses are in synchronism with the alternating currents.

4. In a device of the character described, a reciprocable armature, a pair of direct current coils embracing the path of movement of said armature and tending to polarize said armature, said coils being so wound and connected as to be complementary to each other, a pair of alternating current coils so wound and connected as to be in opposition to each other and arranged to embrace the armature path one adjacent each of the direct current coils, conductors from a source of alternating current supply, a rectifying element connected between said conductors and the direct current coils to supply direct current thereto, and electrical connections from said conductors to simultaneously supply alternating current to the alternating current coils.

5. In a device of the character described, a reciprocable armature, a pair of direct current coils embracing said armature connected in series, so wound and connected and spaced longitudinally of said armature as to respectively tend to magnetize said armature and move it in opposite directions, a pair of alternating current coils also embracing said armature and positioned one adjacent each direct current coil, said alternating current coils being connected in series and so wound and connected as to simultaneously assist and oppose the respective adjacent direct current coils, conductors from a source of alternating current, a rectifier connected to said conductors, connections from the rectifier to the direct current coils, and connections from the first mentioned conductors to the alternating current coils to supply alternating currents thereto.

6. In a device of the character described, a reciprocable armature, a pair of direct current coils embracing said armature and connected in series, a pair of alternating current coils also embracing said armature connected in series and arranged one adjacent each of the first coils, a pair of conductors from a source of alternating current, a reactance coil connected to one conductor, a conductor from said reactance coil intermediate its ends to one end of the alternating current coils, a lead from the other conductor to the other end of the alternating current coils and a rectifying device connected to the opposite ends of the reactance coil and the opposite ends of the direct current coils to supply direct current thereto.

7. In a magnetic device, a reciprocable armature, direct current coils embracing the path of movement of said armature and tending to polarize said armature, alternating current coils arranged to embrace the armature path, conductors from a source of alternating current supply, a rectifying element connected between said conductors and the direct current coils to supply direct current thereto, and electrical conductors from said first mentioned conductors to simultaneously supply alternating current to the alternating current coils.

8. In a device of the character described, a reciprocable armature, direct current coils embracing said armature connected in series and spaced longitudinally of said armature so as to respectively tend to magnetize said armature, alternating current coils also embracing said armature, said alternating current coils being connected in series, conductors from a source of alternating current, a rectifier connected to said conductors, conductors from the rectifier to the direct current coils, and conductors from the first mentioned conductors to the alternating current coils to supply alternating currents thereto.

9. In a device of the character described, a reciprocable armature, direct current coils embracing said armature and connected in series, alternating current coils also embracing said armature and connected in series, conductors from a source of alternating current, a reactance coil connected to one of said conductors, a conductor leading from said reactance coil intermediate its ends to one end of the alternating current coils, a conductor from the other of the first named conductors to the other end of the alternating current coils, and a rectifying device connected to the opposite ends of the reactance coil and the opposite ends of the direct current coils to supply direct current thereto.

10. In a magnetic device, a reciprocable armature, direct current coils embracing the path of movement of said armature and tending to polarize said armature, alternating current coils arranged to embrce the armature path, conductors from a source of alternating current supply, a rectifying element connected between said conductors and the direct current coils to supply direct current thereto, and electrical conductors from said first mentioned conductors to simultaneously supply alternating current to the alternating current coils, said rectifying element and the direct current coils being connected in series with the alternating current coils.

11. In a device of the character described, a reciprocable armature, direct current coils arranged to polarize said armature, alternating current coils arranged adjacent the direct current coils, conductors from a source of alternating current supply, a rectifying means connected between said conductors and the direct current coils to supply direct current thereto, said rectifying means and the direct current coils being connected in series with the alternating current coils, and conductors from the first mentioned conductors to simultaneously supply alternating current to the alternating current coils.

12. In a device of the character described, a reciprocating magnetic member, means subjecting said member to the influence of a direct current magnetic flux tending to polarize the member, and means for alternately adding and opposing another magnetic flux to the first mentioned flux at all times in constant ratio thereto.

13. In a device of the character described, a reciprocating magnetic member, means for subjecting said member to the influence of direct current, a plurality of magnetic fluxes tending to polarize said member, means for adding an additional magnetic flux to the respective direct current magnetic fluxes alternately, means for simultaneously opposing a separate flux to one of the direct current magnetic fluxes while the second mentioned means is adding flux to another of the direct current magnetic fluxes, and means for maintaining said modifying fluxes in constant ratio to the direct current magnetic fluxes.

THOMAS J. MURPHY.